United States Patent
Spangler et al.

(10) Patent No.: US 7,815,036 B2
(45) Date of Patent: Oct. 19, 2010

(54) MODULAR MANUFACTURING CHAIN INCLUDING A POSITION TRACKING DEVICE AND METHOD OF OPERATION THEREFOR

(75) Inventors: John M. Spangler, Peoria, IL (US); Mark E. Dietz, Hanna City, IL (US)

(73) Assignee: Caterpillar Inc, Peoria, IL (US)

( * ) Notice: Subject to any disclaimer, the term of this patent is extended or adjusted under 35 U.S.C. 154(b) by 235 days.

(21) Appl. No.: 12/151,891

(22) Filed: May 9, 2008

(65) Prior Publication Data

US 2009/0277749 A1 Nov. 12, 2009

(51) Int. Cl.
 *B65G 43/08* (2006.01)
(52) U.S. Cl. .............................. 198/464.1; 198/341.01; 198/571
(58) Field of Classification Search ............ 198/341.01, 198/341.03, 464.1, 464.2, 464.3, 571, 572, 198/575
 See application file for complete search history.

(56) References Cited

U.S. PATENT DOCUMENTS

| | | | | |
|---|---|---|---|---|
| 4,385,685 A | * | 5/1983 | Sticht | 198/341.01 |
| 5,150,781 A | * | 9/1992 | Deisenroth et al. | 198/349.8 |
| 5,186,308 A | * | 2/1993 | Munro | 198/572 |
| 5,439,704 A | | 8/1995 | Sankaran et al. | |
| 5,487,768 A | | 1/1996 | Zytka et al. | |
| 5,713,452 A | * | 2/1998 | Halsted | 198/468.1 |
| 5,785,168 A | | 7/1998 | Beall, Jr. | |
| 6,120,604 A | | 9/2000 | Hawkins | |
| 6,502,294 B2 | * | 1/2003 | Kusmierczyk et al. | 29/430 |
| 6,513,231 B1 | | 2/2003 | Hafenrichter et al. | |
| 6,916,375 B2 | | 7/2005 | Molnar et al. | |
| 7,178,661 B2 | | 2/2007 | Tabler | |
| 7,263,409 B2 | * | 8/2007 | LeVasseur et al. | 198/571 |
| 2007/0056510 A1 | | 3/2007 | Antaya | |

FOREIGN PATENT DOCUMENTS

WO WO 00/68117 11/2000

OTHER PUBLICATIONS

Portable Modular Manufacturing System; U.S. Appl. No. 11/700,109, filed Jan. 31, 2007.

* cited by examiner

*Primary Examiner*—James R Bidwell
(74) *Attorney, Agent, or Firm*—Liell & McNeil

(57) ABSTRACT

A manufacturing chain includes a plurality of modular manufacturing stations positioned in series. A first position tracking device of a first modular manufacturing station is configured to detect a first position of a carrier being transported along a first article transportation device through the first modular manufacturing station. A control system is in communication with the first position tracking device and is configured to receive a signal indicative of the detected first position. The control system is also configured to issue an operation signal to a second article transportation device of a second modular manufacturing station based, at least in part, on the detected first position.

20 Claims, 7 Drawing Sheets

MODULAR MANUFACTURING CHAIN INCLUDING A POSITION TRACKING DEVICE AND METHOD OF OPERATION THEREFOR

TECHNICAL FIELD

The present disclosure relates generally to a manufacturing chain, and more particularly to a modular manufacturing chain having at least one position tracking device.

BACKGROUND

During a manufacturing process, a product is typically advanced through a plurality of manufacturing stations of a manufacturing chain. Specifically, the product is transported through each of the manufacturing stations along an article transportation device. At each manufacturing station, a specific one of a plurality of tasks in the manufacturing process is performed. All equipment and other components necessary to perform the assigned task are positioned, and often permanently affixed, at each manufacturing station. As a result, and dependent upon the number of tasks and the complexity of the manufacturing process, a manufacturing chain is typically a large structure that is permanently situated inside a manufacturing facility.

At least partially as a result of its permanency, a manufacturing chain is typically inflexible, such that modifying, removing, or replacing the manufacturing chain may be an expensive and time-consuming process. Therefore, even minor improvements to the manufacturing process, such as, for example, changes to the equipment positioned at one manufacturing station, may be too expensive and time consuming to implement. Further, if the manufacturing process performed by the manufacturing chain becomes unnecessary, it may not be feasible to alter the manufacturing chain to perform a different manufacturing process. Ultimately, the manufacturing chain may only be cost effective in performing the specific manufacturing process for which it was designed. As a result, the significant amount of costs and efforts to design and construct the manufacturing chain may be wasted.

Another drawback with conventional manufacturing chains involves the article transportation system along which the products are transported. Since the products are typically carried along one article transportation device having a single driving source, such as a common monorail conveyor, the entire manufacturing chain must be stopped in order to correct a problem occurring at any point along the manufacturing chain. Power and free conveyors offer one solution by allowing carriers to be routed off of the main line, such as if a defect is identified, but still provide continuous movement of the main line. In either case, stopping the main line can result in significant down time and, therefore, reduced efficiency and, ultimately, throughput of the manufacturing chain. This may further increase process time for manufacturing processes that already require a significant amount of time. For example, it is known that a drying or curing stage of a paint process may require a significant amount of time, thus greatly increasing the minimal process time for the manufacturing process.

U.S. Pat. No. 6,120,604 teaches a powder coating chain having a plurality of conveyors for transporting parts through a plurality of processing areas. Specifically, each processing area includes a separate motor driven conveyor, sensors for providing information on conditions within the processing area, and a control circuit coupled to both the sensors and an operator interface. A user may manipulate the operator interface to monitor sensed conditions within each processing area. Although the reference suggests an aspect of modularity that may offer certain limited benefits, it does not contemplate improvements to the overall process flow within the manufacturing chain. In fact, the reference does not disclose modifications to the exemplary high-speed blank powder coating process, but rather seeks to quickly identify a source of a mechanical problem associated with the process. As should be appreciated, there is a continuing need for manufacturing chains providing improved quality and efficiency with respect to a manufacturing process. In addition, there is a continuing need for manufacturing chains, or manufacturing stations thereof, that may be more easily modified, removed, or replaced.

The present disclosure is directed to one or more of the problems set forth above.

SUMMARY OF THE DISCLOSURE

In one aspect, a manufacturing chain includes a plurality of modular manufacturing stations positioned in series. A first position tracking device of a first modular manufacturing station is configured to detect a first position of a carrier being transported along a first article transportation device through the first modular manufacturing station. A control system is in communication with the first position tracking device and is configured to receive a signal indicative of the detected first position. The control system is also configured to issue an operation signal to a second article transportation device of a second modular manufacturing station based, at least in part, on the detected first position.

In another aspect, a manufacturing module includes a plurality of beams forming a skeleton and defining an entry and an exit of the manufacturing module. At least a first modular manufacturing and a second modular manufacturing station are disposed between the entry and the exit. Each of the first and second modular manufacturing stations includes an article transportation device supported by at least one of the beams, at least one piece of manufacturing equipment, and a first position tracking device. The first position tracking device is configured to detect a first position of a carrier being transported along the article transportation device through the modular manufacturing station. A control system is in communication with the first position tracking device of the first modular manufacturing station and is configured to receive a signal indicative of the detected first position. The control system is also configured to issue an operation signal to a second article transportation device of the second modular manufacturing station based, at least in part, on the detected first position.

In yet another aspect, a method for operating a manufacturing chain having a plurality of modular manufacturing stations includes a step of advancing at least one carrier from a beginning of the manufacturing chain to an end of the manufacturing chain along a plurality of article transportation devices. The advancing step includes detecting a first position of a first carrier within a first modular manufacturing station using a first position tracking device, and issuing an operation signal to an article transportation device of a second modular manufacturing station based, at least in part, on the detected first position.

DETAILED DESCRIPTION

Figure 1:
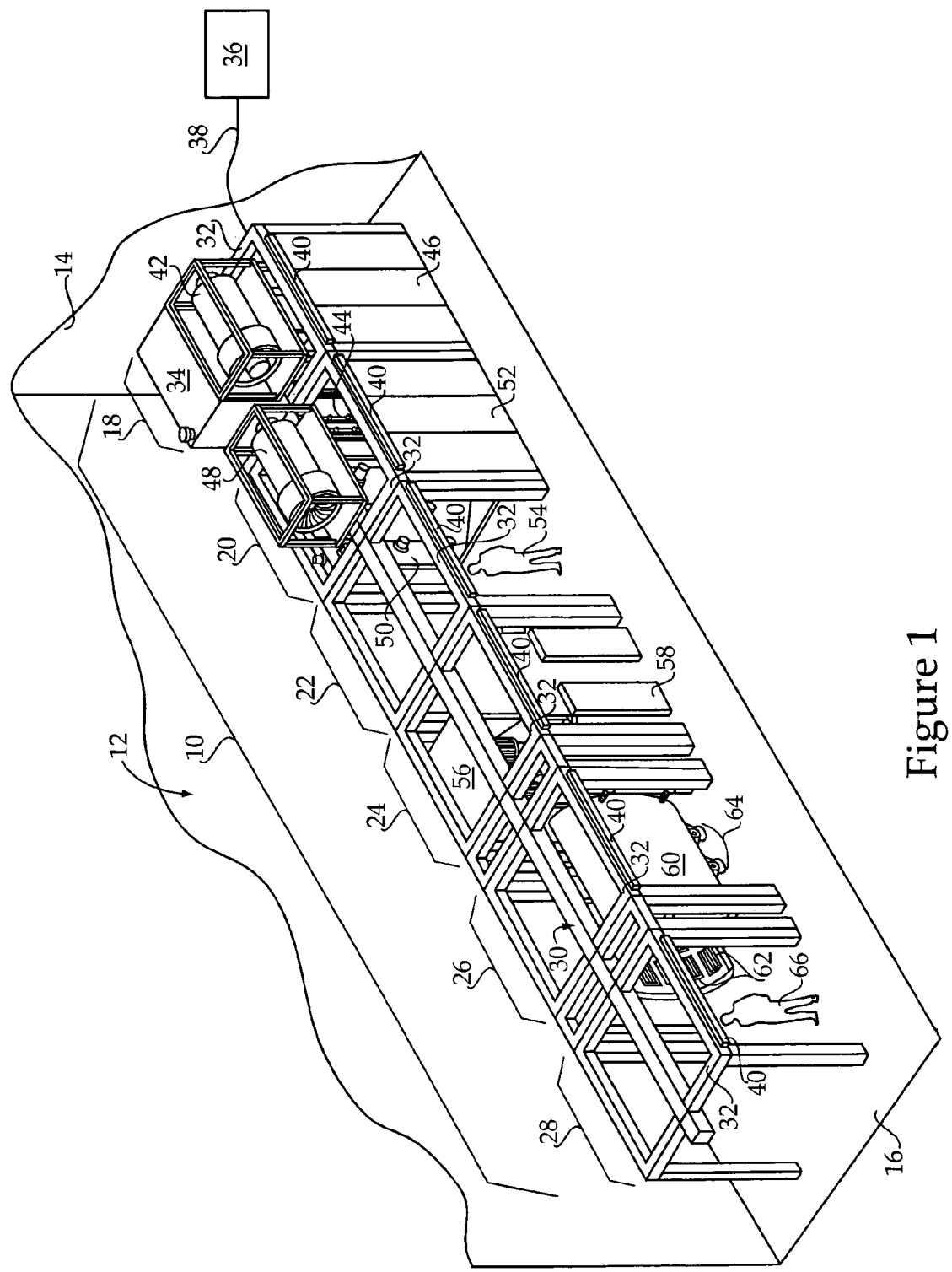
FIG. 1 is a diagrammatic perspective view of a manufacturing chain, according to the present disclosure.

An exemplary embodiment of a manufacturing chain 10 is shown generally in FIG. 1. The manufacturing chain 10 may be disposed within a manufacturing area 12, such as, for example, a manufacturing area defined by a building 14. According to one embodiment, the manufacturing chain 10 may be secured to, and positioned above, a planar floor 16 of the manufacturing area 12. However, numerous locations and arrangements are contemplated for the manufacturing chain 10. According to the exemplary embodiment, the manufacturing chain 10 may be used to perform a paint-process, such as, for example, a powder coating process, and, therefore, may also be referred to as a paint line. Although a paint process is described, however, it should be appreciated that the manufacturing chain 10 may be designed to perform any of a variety of manufacturing processes.

The manufacturing chain 10, also referred to as a modular manufacturing chain, may include several modular manufacturing stations, such that each modular manufacturing station is configured to perform at least one task in the manufacturing process. Specifically, and according to one example, the manufacturing chain 10 may include a wash station 18, a blow off station 20, an inspection station 22, a paint application station 24, a curing station 26, and an unload station 28. Although six modular manufacturing stations 18, 20, 22, 24, 26, and 28 are shown, it should be appreciated that the manufacturing chain 10 may include any number of modular manufacturing stations necessary to perform the designated manufacturing process. It should also be appreciated that the paint process, as described herein, has been simplified for ease of explanation, and is in no way meant to be limited to the specific tasks described.

The modular manufacturing stations 18, 20, 22, 24, 26, and 28 may be positioned in series, as shown, or the manufacturing chain 10 may include one or more of the modular manufacturing stations 18, 20, 22, 24, 26, and 28 positioned in parallel, as dictated by the specific tasks of the manufacturing process. Further, the modular manufacturing stations 18, 20, 22, 24, 26, and 28 may include equipment, and other components, necessary to accomplish the task to be performed at the respective one of the modular manufacturing stations 18, 20, 22, 24, 26, and 28. It should be appreciated that multiple tasks may be performed at one modular manufacturing station or, alternatively, a more complex task may be performed over a plurality of modular manufacturing stations. Ultimately, one or more tasks may be performed on an article, or product, as it is transported through the modular manufacturing stations 18, 20, 22, 24, 26, and 28 along an article transportation system 30, described later in greater detail.

The equipment and other components necessary to perform a task at a respective one of each of the modular manufacturing stations 18, 20, 22, 24, 26, and 28 may be supported by a framework or, more specifically, a manufacturing module 32. For example, the manufacturing chain 10 may include a plurality of manufacturing modules 32 positioned and configured to accommodate the modular manufacturing stations 18, 20, 22, 24, 26, and 28. As shown in the embodiment of FIG. 1, the manufacturing modules 32 may be positioned in series, as dictated by the modular manufacturing stations 18, 20, 22, 24, 26, and 28. However, the size and geometry of the manufacturing chain; 10, comprising the manufacturing modules 32, may include any of a variety of possible sizes and configurations, such as, for example, an "L" shaped configuration or a "U" shaped configuration. Further, although FIG. 1 illustrates exactly one of the modular manufacturing stations 18, 20, 22, 24, 26, and 28 associated with each manufacturing module 32, it should be appreciated that each manufacturing module 32 may support more than one of the modular manufacturing stations 18, 20, 22, 24, 26, and 28.

According to the exemplary embodiment, the wash station 18 may be configured to perform a wash and/or rinse task of the paint process. Specifically, the wash station 18 may include a water tank 34, supported by the manufacturing module 32, for supplying water, or a solvent mixture, to the wash station 18. Alternatively, however, water may be supplied directly to the wash station 18 from a utility infrastructure of the building 14 or, alternatively, from an external utility connection 36 disposed outside the manufacturing area 12 and connected to the manufacturing chain 10 via a conduit 38. The external utility connection 36 may, therefore, include a source of water or, alternatively, may include a source of another utility, such as, for example, electric power or data.

According to the current embodiment, the conduit 38 may provide water to a utility transfer module 40 supported by the manufacturing module 32. The utility transfer module 40 may be configured to transfer a utility, such as, for example, electric power, fluid, or data, through the manufacturing module 32. The utility may be used at the wash station 18 and, further, may be transferred to a contiguous manufacturing module 32. For example, each of the other manufacturing modules 32 may include utility transfer modules 40, such that a utility may be supplied at one manufacturing module 32 and used at another. Specifically, each manufacturing module 32 may receive a utility from a preceding manufacturing module 32 of the manufacturing chain 10, and may transfer the utility to a succeeding manufacturing module 32.

The wash station 18 may further include a water pump 42 for circulating the water or solvent mixture through the wash station 18 and/or pressurizing the water or solvent mixture. According to one embodiment, the water or solvent mixture may be directed through a plurality of water nozzles 44, such that the water nozzles 44 are configured to spray an article as it passes through the wash station 18 to remove any foreign substances deposited on the article. Such foreign substances may include, for example, grease, dirt, dust, oils, or any other substances that may interfere with the paint application process. The wash station 18 may also include a plurality of water barrier panels 46 for preventing the water or the solvent mixture from escaping the wash station 18, and a drain system for returning the used water or the solvent mixture to the water tank 34. It should be appreciated that the wash station 18 may include any equipment useful in removing foreign substances from an article before paint, such as, for example, powdered paint, is applied.

The blow off station 20 may be configured to remove any water or solvent mixture remaining on the article after the article passes through the wash station 18. Specifically, the blow off station 20 may include a fan 48, or pump, for pressurizing air and a plurality of air nozzles 50 for directing the pressurized air toward the article. Either or both of the fan 48 and air nozzles 50 may be supported by the manufacturing module 32. Further, the blow off station 20 may include a hose (not shown) available to an operator for manually directing pressurized air toward the article. According to one embodiment, pressurized air may be provided via the utility transfer module 40. Specifically, pressurized air may be supplied to the utility transfer module 40 directly from a source, or indirectly via the utility transfer module 40 of a contiguous manufacturing module 32.

Air barrier panels 52, or walls, may also be provided at the blow off station 20 for preventing pressurized air blown from the air nozzles 50 from interfering with activities or equipment outside of the blow off station 20. After the water or solvent mixture is sufficiently removed from the article at the blow off station 20, the article may be transported to the inspection station 22, which may provide a location for an operator 54 to inspect the article. The inspection may, for example, involve visual, physical, or chemical analyses to determine the presence of any remaining impurities on the surface of the article.

After inspection, the article may be transported along the article transportation system 30 to the paint application station 24. The paint application station 24 may include a piece of paint application equipment 56 for coating the article with paint, such as, according to one example, a powdered paint. The paint application station 24 may further include a plurality of paint barrier panels 58 for restricting the paint to the confines of the paint application station 24. Either or both of the paint application equipment 56 and the paint barrier panels 58 may be supported by the manufacturing module 32. Alternatively, however, the paint application equipment 56 and the paint barrier panels 58 may be secured to the planar floor 16. As should be appreciated, the equipment used at the paint application station 24 may vary, depending on the type of paint used and the application process that is implemented. For example, the paint may be sprayed onto the article or, alternatively, the article may be immersed in a tank containing paint.

From the paint application station 24, the article may be transported to the curing station 26. The curing station 26 may be configured to heat or otherwise cure the coating of freshly applied paint. According to one embodiment, the curing station 26 may include a plurality of infrared heaters 60, which may contain a plurality of infrared heater lamps 62 for generating the heat necessary for causing the coating of paint on the article to cure. According to one embodiment, the infrared heaters 60 may be portable. For example, one or more sets of rollers 64 may be provided to facilitate movement of the infrared heaters 60 from one location, such as a storage location, and into the illustrated position relative to the paint application station 24. It should be appreciated that "portable" equipment, as used herein, may refer to any equipment or component that may not be characterized as a fixture or otherwise permanently attached component. It should also be appreciated that any equipment useful in making the coating of paint applied to the article permanent is contemplated for use at the curing station 26.

For simplicity, the exemplary paint process is described as having one paint application station 24; however, it should be appreciated that a paint process may often include coating the article with multiple coatings of paint. As a result, the manufacturing chain 10 may include additional paint applications stations 24 and, if necessary, manufacturing modules 32 to accommodate such a process. Ultimately, after the desired number of paint coatings are applied to the article, the article may be transported to the unload station 28. At the unload station 28, the article may be removed from the manufacturing chain 10 or, more specifically, the article transportation system 30 by an operator 66. After passing through the manufacturing chain 10, it is contemplated that the article may be transported to another manufacturing chain for further processing, if desired. According to one embodiment, the article may be routed to a buffer area before passing to another manufacturing chain. Alternatively, the article may be taken to a storage location for storage, or to a transportation vehicle for delivery to a customer.

Figure 2:
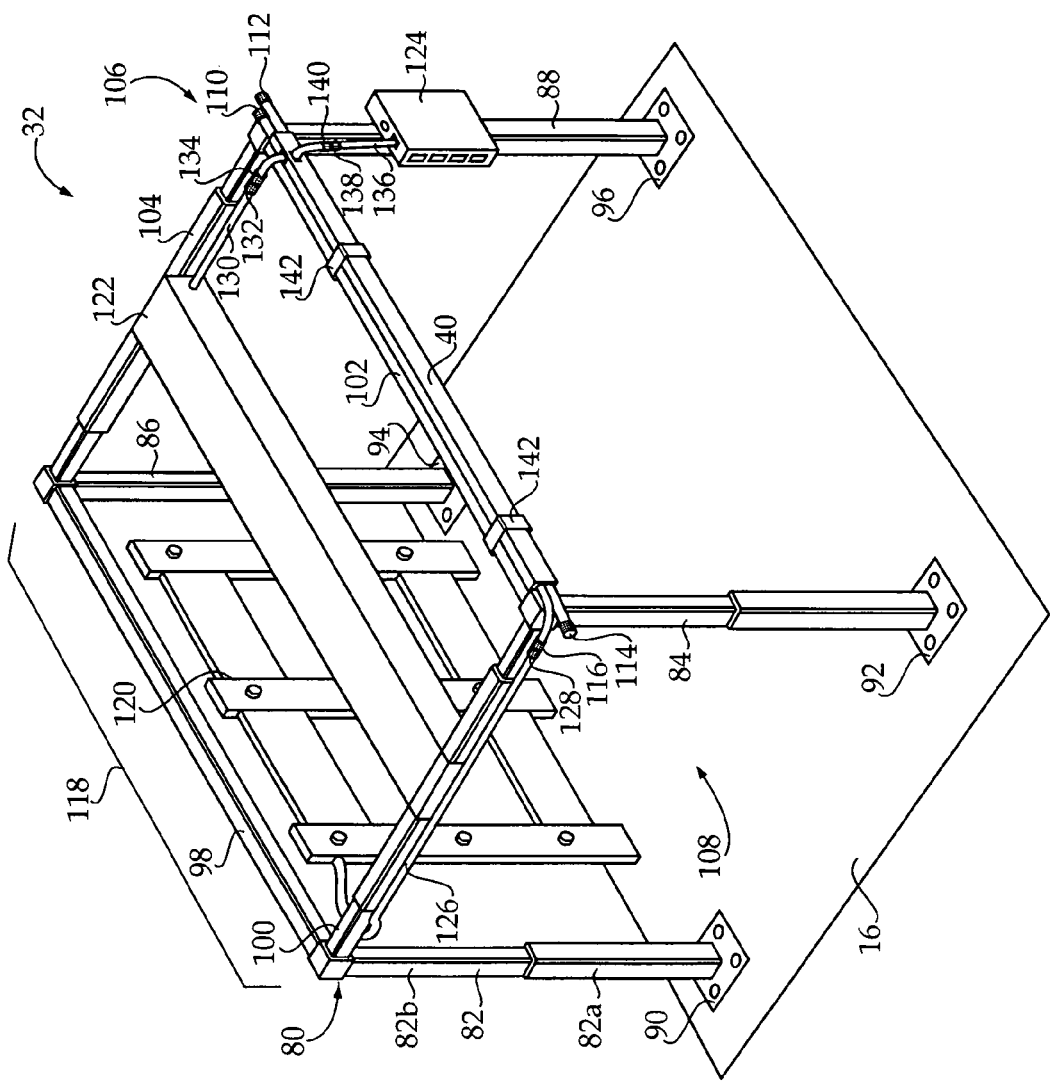
FIG. 2 is a diagrammatic perspective view of a manufacturing module of the manufacturing chain of FIG. 1, according to the present disclosure.

Turning now to FIG. 2, an exemplary manufacturing module 32 for supporting one or more of the modular manufacturing stations 18, 20, 22, 24, 26, and 28 of FIG. 1 is shown in greater detail. Specifically, the manufacturing module 32 may consist of a plurality of beams, such as tubular beams, forming a framework or skeleton 80. According to one embodiment, the skeleton 80 may include a plurality of vertically aligned support beams 82, 84, 86, and 88 attached to the planar floor 16 using support plates 90, 92, 94, and 96, respectively. Although a bolted connection is shown, it should be appreciated that the support beams 82, 84, 86, and 88 and/or support-plates 90, 92, 94, and 96 may be attached to the planar floor 16 using any secure connection.

The vertically aligned support beams 82, 84, 86, and 88 may be interconnected using a plurality of additional support beams, such as horizontally aligned beams 98, 100, 102, and 104. The horizontally aligned support beams 98, 100, 102, and 104 and vertically aligned support beams 82, 84, 86, and 88 may define an entry 106 and an exit 108 of the manufacturing module 32, and may provide structural support for one or more modular manufacturing stations, such as the modular manufacturing stations 18, 20, 22, 24, 26, and 28 of FIG. 1. As such, the support beams 82, 84, 86, 88, 98, 100, 102, and 104 may be fabricated from steel, carbon composites, or any other material known in the art suitable for providing the desired support. According to one embodiment, it may be desirable to utilize a relatively lightweight material to ease the transport and/or construction of the manufacturing module 32.

Additionally, it may be desirable to allow for expansion and/or contraction of one or more of the support beams 82, 84, 86, 88, 98, 100, 102, and 104. Such expansion and/or contraction may further ease the transport and/or construction of the manufacturing module 32, and may also allow for a customized size and/or shape of each manufacturing module 32. For example, the desired size and/or shape of the manufacturing module 32 may depend upon a number of factors including, but not limited to, the number of modular manufacturing stations, such as modular manufacturing stations 18, 20, 22, 24, 26, and 28, disposed within the manufacturing module 32.

To facilitate adjustment, one or more of the support beams 82, 84, 86, 88, 98, 100, 102, and 104 may include a hollow tubular portion and a piston portion. For example, vertically aligned support beam 82 is shown having a tubular portion 82*a* and a piston portion 82*b*. As should be appreciated, the piston portion 82*b* may be slidably received within the tubular portion 82*a* and locked at a desired length. Locking may be accomplished using any known fastening devices, such as, for example, bolts, screw, pins, or spring-actuated bearings. Alternatively, however, each of the support beams 82, 84, 86, 88, 98, 100, 102, and 104 may be fabricated to various desired lengths, as dictated by the design of the manufacturing module 32. According to one embodiment, it may be desirable to expand and/or contract only the vertically aligned support beams 82, 84, 86, and 88.

Although the support beams 82, 84, 86, 88, 98, 100, 102, and 104 are illustrated as forming a cubic shape, they may, alternatively, be positioned to form any shape conducive to the specific manufacturing process being performed. Additionally, the number of support beams 82, 84, 86, 88, 98, 100, 102, and 104 utilized to form the skeleton 80 may vary depending upon the shape of the manufacturing module 32. The support beams 82, 84, 86, 88, 98, 100, 102, and 104 of the manufacturing module 32 may be secured together by mechanical fasteners, welds, or any other devices known in the art that are used to secure components. Additionally, the skeleton 80 of the manufacturing module 32 may be attached to the framework of a contiguous manufacturing module 32 using similar fasteners. Alternatively, however, the manufacturing module 32 may be positioned adjacent a contiguous manufacturing module 32 and may not be attached thereto. A "contiguous" manufacturing module, as used herein, may refer to a manufacturing module, such as manufacturing module 32, positioned in close proximity to another manufacturing module, such as, for example, a preceding or succeeding manufacturing module in the manufacturing chain 10.

One or more of the support beams 82, 84, 86, 88, 98, 100, 102, and 104 of the skeleton 80 may support the utility transfer module 40. The utility transfer module 40 may be configured to transfer at least one of electric power, fluid, and data through the manufacturing module 32. Specifically, the utility transfer module 40 may transfer and/or provide electric power, water, compressed air, gas, or other utilities to the one or more modular manufacturing stations, such as modular manufacturing stations 18, 20, 22, 24, 26, and 28, supported by the manufacturing module 32. According to one embodiment the utility transfer module 40 may include a collection of wires, cables, or other conduits capable of transferring one or more utilities.

The utility transfer module 40 may include an external port 110 for engaging an external utility connection, such as, for example, the external utility connection 36 of FIG. 1. Although the external utility connection 36 is positioned outside the building 14; it should be appreciated that the external utility connection 36 may be positioned within the building 14, such as within the manufacturing area 12. According to one embodiment, the external utility connection 36 includes a utility source, such as, for example, an electric power grid, a generator, a battery, a compressed air tank, a hydraulic tank, and/or a water supply. It should be appreciated that the external utility connection 36 may include any source of a utility that is utilized by the manufacturing chain 10. Accordingly, each utility transfer module 40 may include multiple external ports 110, depending on the number of utility sources to be engaged.

Each utility transfer module 40 may also include an entry port 112 for engaging a utility transfer module 40 of a preceding manufacturing module 32, and an exit port 114 for engaging a utility transfer module 40 of a succeeding manufacturing module 32. It should be appreciated that the entry port 112 of the utility transfer module 40 of the first manufacturing module 32 in the manufacturing chain 10 may remain unused and, similarly, the exit port 114 of utility transfer module 40 of the last manufacturing module 32 may remain unused. Such ports, however, may become necessary, such as, for example, when an additional manufacturing module 32 is added to the manufacturing chain 10.

Additionally, the utility transfer module 40 may include one or more equipment ports, such as a first equipment port 116, for providing a utility to the one or more modular manufacturing stations, such as the modular manufacturing stations 18, 20, 22, 24, 26, and 28, of the manufacturing module 32. According to a more general example, manufacturing module 32 may support a first modular manufacturing station 118 that is configured to perform at least one task of a manufacturing process. Accordingly, the first modular manufacturing station 118 may include equipment, and other systems and/or components, necessary to accomplish the task to be performed. Specifically, and according to one example, the first modular manufacturing station 118 may include a piece of manufacturing equipment 120, an article transportation device 122 representing a portion of the article transportation system 30 corresponding to the station 118, and a station control system 124. Although the manufacturing equipment 120 is exemplified as a plurality of air nozzles, similar to air nozzles 50, it should be appreciated that any manufacturing equipment useful in performing a manufacturing task is contemplated.

One or more of the manufacturing equipment 120, the article transportation device 122, and the station control system 124 may receive utilities, such as electric power, fluid, and data, from the utility transfer module 40. For example, the manufacturing equipment 120 may include a conduit 126 having a quick connect coupling member 128 for engaging the first equipment port 116. Similarly, the article transportation device 122 may include a conduit 130 having a quick connect coupling member 132 for engaging a second equipment port 134 of the utility transfer module 40. In addition, the station control system 124 may include conduit 136 having a quick connect coupling member 138 for engaging a third equipment port 140 of the utility transfer module 40.

It should be appreciated that any of the ports or connections described herein, such as, for example, ports 110, 112, 114, 116, 134, and 140, may embody electrical outlets, quick connect coupling members, or any other known utility interfaces. In addition, each of the quick connect coupling members 128, 132, and 138 may embody any appropriate utility interface for engaging one or more of the ports 110, 112, 114, 116, 134, and 140. It should also be appreciated that quick connect coupling members may enable relatively quick and easy assembly and/or disassembly of the manufacturing stations, such as modular manufacturing stations 18, 20, 22, 24, 26, and 28, and/or first modular manufacturing station 118. Additional benefits may be recognized by utilizing common, or universal, interfaces throughout the entire manufacturing chain 10.

According to one embodiment, the utility transfer module 40 may be secured to one of the support beams 82, 84, 86, 88, 98, 100, 102, and 104, such as support beam 102, using one or more mounting devices 142. Mounting devices 142 may, for example, include hooks, latches, sockets, or any other devices capable of securing the utility transfer module 40 to one or more of the support beams 82, 84, 86, 88, 98, 100, 102, and 104. Alternatively, however, the utility transfer module 40 may be positioned within a hollow portion, such as, for example, a central portion, of one or more of the tubular support beams 82, 84, 86, 88, 98, 100, 102, and 104. It should be appreciated that the utility transfer module 40 may be supported by and/or secured to any number of the support beams 82, 84, 86, 88, 98, 100, 102, and 104, as necessary to transfer a utility through and/or provide a utility to the manufacturing module 32.

Figure 3:
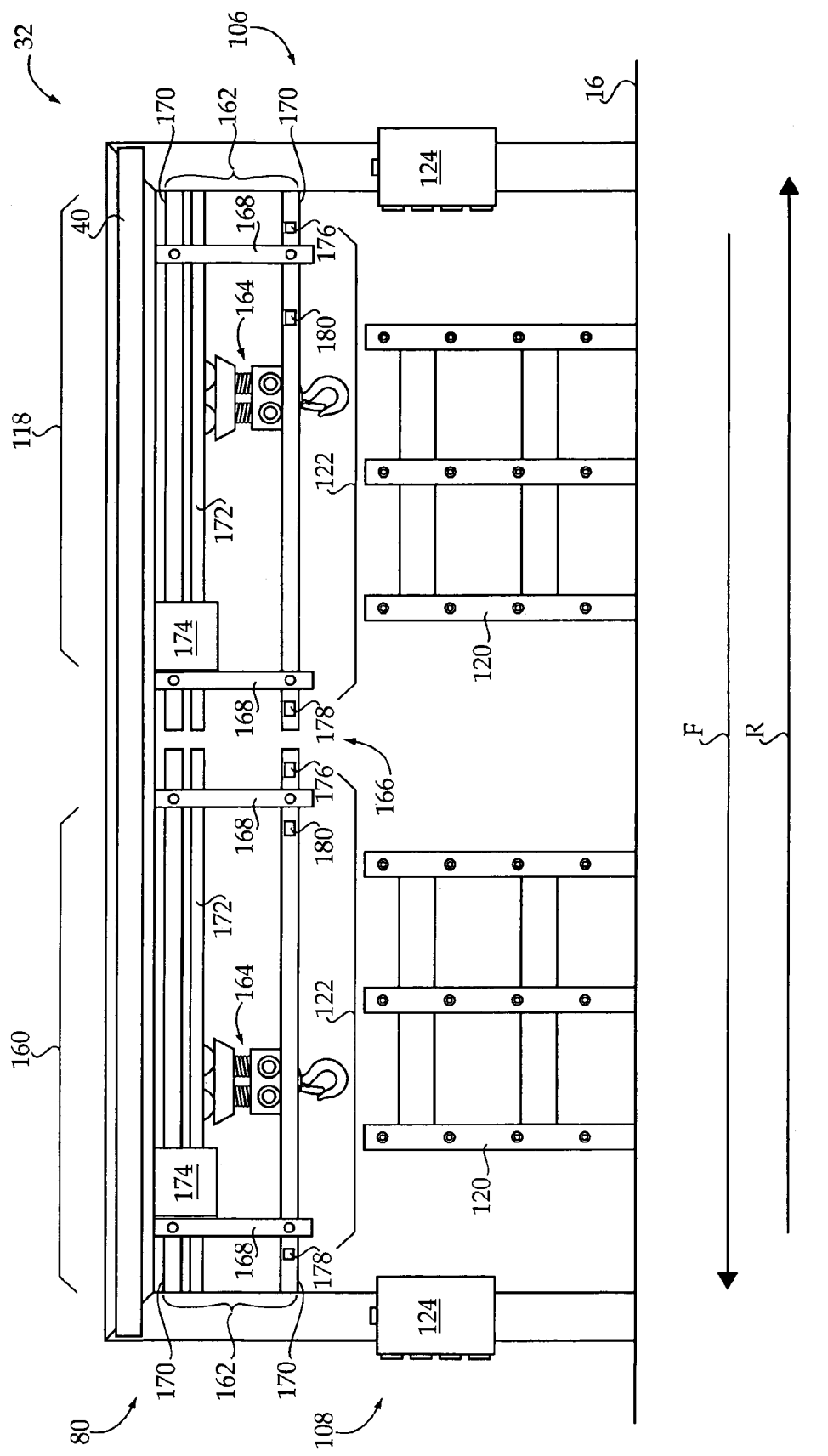
FIG. 3 is a side diagrammatic view of an alternative embodiment of the manufacturing module of FIG. 2, according to the present disclosure.

Turning now to FIG. 3, an alternative embodiment of a manufacturing module 32 is shown. Specifically, one or more of the manufacturing modules 32 may include a second modular manufacturing station 160 disposed between the entry 106 and the exit 108 of the manufacturing module 32. The second modular manufacturing station 160 may include similar systems and/or components as the first modular manufacturing station 118. Specifically, the second modular manufacturing station 160 may include at least one piece of manufacturing equipment 120, an article transportation device 122 representing a portion of article transportation system 30 corresponding to the second modular manufacturing station 160, and a station control system 124.

It should be appreciated that each of the systems and/or components of the second modular manufacturing station 160 may also receive a utility from the utility transfer module 40 in a manner similar to that described above. It should further be appreciated that either or both of the first and second modular manufacturing stations 118 and 160 may be representative of the modular manufacturing stations 18, 20, 22, 24, 26, and 28 of FIG. 1. Accordingly, each of the modular manufacturing stations 18, 20, 22, 24, 26, and 28 may generally include one or more of the manufacturing equipment 120, article transportation device 122, and station control system 124.

Each article transportation device 122 may include a friction drive system having one or more sets of carrier tracks, such as carrier tracks 162, along which a carrier 164 may be transported. It should be appreciated that the one or more sets of carrier tracks 162 may define a transportation path 166 through a manufacturing chain, such as the manufacturing chain 10 of FIG. 1. Friction drive systems are known, and may generally include one or more hanger rails 168 fixedly attached to the skeleton 80 for supporting one or more support rails 170. At least one of the support rails 170 may provide support for a drive shaft 172 that may be mechanically coupled to a drive system 174.

The drive system 174 may, for example, include an electric, hydraulic, or pneumatic motor, and may further include a transmission and controls, as necessary, for driving the drive shaft 172 at a desired speed and in a desired direction. For example, the drive shaft 172 may be rotated in a first direction for frictionally engaging wheels of the carrier 164 such that the carrier 164 is moved in a forward transport direction, represented by arrow "F". Alternatively, however, the drive shaft 172 may be rotated, by the drive system 174, in an opposite direction for frictionally engaging wheels of the carrier 164 to move the carrier 164 in a reverse transport direction "R" that is opposite the forward transport direction "F." A similar friction drive system may be provided by OCS IntelliTrak, Incorporated of Cincinnati, Ohio.

Although a friction drive system is described, however, it should be appreciated that a variety of material handling systems may be used. For example, an air balancer, a series of hoists, an electrified monorail, or any other device capable of moving an article through the manufacturing chain 10 are also contemplated. Further, it should be appreciated that carriers, such as carriers 164, may include any devices capable of gripping an article to be conveyed through the manufacturing chain 10. Exemplary carriers may, for example, include hooks, clamps, latches, or any other devices capable of temporarily grasping the article. Although a single carrier 164 is depicted for transporting an article, it should be appreciated that multiple carriers may be necessary for transporting the article, depending on the size and weight of the article.

It is also contemplated that the article transportation system 30 may be substituted with a chain, belt, or any other device that may convey carriers 164 through the manufacturing chain 10. According to one embodiment, the article transportation system 30 may be mounted to the planar floor 16 and/or contain a transport device, such as, for example, a conveyor belt to convey the article through the manufacturing chain 10. Preferably, however, the article transportation devices 122 that define the article transportation system 30 may each include at least one drive system 174, or similar means, for facilitating independent movement of the carrier 164 within the respective one of the manufacturing stations 118 and 160.

Each station control system 124 may be configured to control operation of at least one of the article transportation device 122 and the manufacturing equipment 120 of the respective one of the modular manufacturing stations 118 and 160. Specifically, the station control system 124 may be in communication with the article transportation device 122 or, more specifically, the drive system 174, and may be configured to issue an operation signal, such as, for example, a forward signal, a reverse signal, and a stop signal. The forward signal may correspond to the forward transport direction "F," the reverse signal may correspond to the reverse transport direction "R," and the stop signal may correspond to a stationary position: It should be appreciated that the stationary position may represent a state in which the carrier 164 is not driven in either of the forward transport direction "F" or the reverse transport direction "R".

According to one embodiment, the carrier 164 of the first modular manufacturing station 118 may be driven in the forward transport direction "F" while the carrier 164 of the second modular manufacturing station 160 is simultaneously driven in the reverse transport direction "R" or, alternatively, remains stationary. According to a specific example, it may be desirable to move the carrier 164 of the second modular manufacturing station 160 in the reverse transport direction "R" relative to the manufacturing equipment 120. As should be appreciated, continuous forward and reverse movement relative to the manufacturing equipment 120 may prove beneficial in a variety of tasks of a manufacturing process, including, but not limited to, a wash task and a blow off task, as described above. According to an additional example, it may be desirable to stop the carrier 164 of the second modular manufacturing station 160, such as in response to the identification of a defect, while one or more other carriers 164 continue to move. A variety of defects are contemplated, such as, for example, defects resulting from process problems and/or equipment failures.

Each modular manufacturing station 118 and 160 may also include one or more position tracking devices. According to one embodiment, a first position tracking device 176, a second position tracking device 178, and a third position tracking device 180 are each positioned for detecting a position of the carrier 164 as it is transported through the station 118 and 160. Position tracking devices 176, 178, and 180 are known, and may include, for example, position sensors, proximity switches, bar code readers, or any other devices capable of detecting a position of the carrier 164. In addition, the position tracking devices 176, 178, and 180 may be supported by the skeleton 80, the article transportation device 122, or may be otherwise positioned. Although three position tracking devices 176, 178, and 180 are shown, it should be appreciated that any number of position tracking devices may be used, as dictated by the manufacturing process.

Each station control system 124 may also be in communication with the position tracking devices 176, 178, and 180, and may receive signals from one or more of the position tracking devices 176, 178, and 180 that are indicative of first, second, and third detected positions of the carrier 164. Each station control system 124 may also be configured to issue one or more operation signals, such as, for example, the forward signal, reverse signal, and stop signal, to the article transportation device 122 based, at least in part, on one of the detected carrier positions. According to one example, it may be desirable for the station control system 124 to issue the stop signal to the article transportation device 122 when the carrier 164 has reached a predetermined position relative to the manufacturing equipment 120. After a predetermined period of time, for example, the station control system 124 may then issue the forward signal to the article transportation device 122. Further, the station control system 124 may issue one or more operation signals to the manufacturing equipment 120 based, at least in part, on one of the detected carrier positions.

Figure 4:
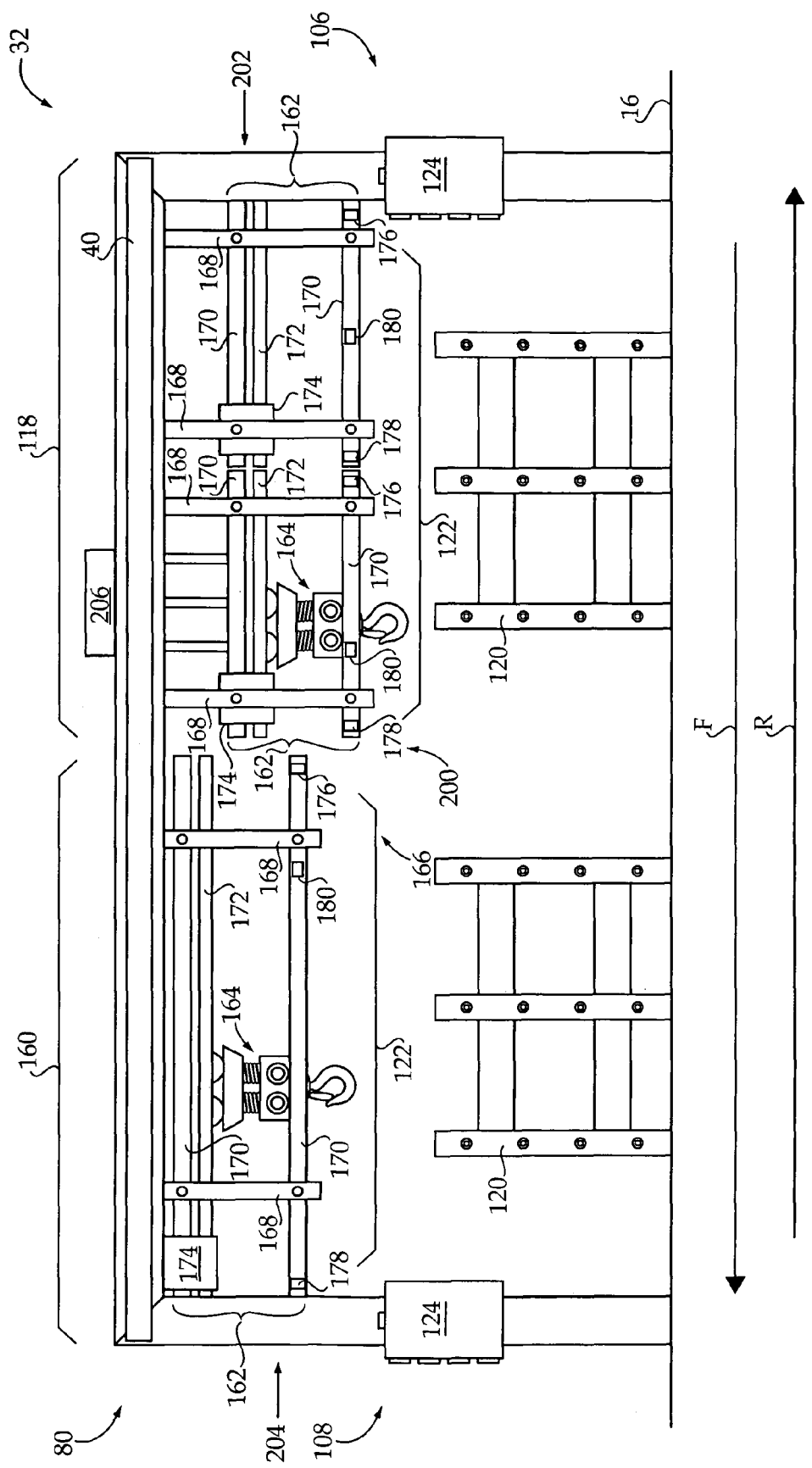
FIG. 4 is a side diagrammatic view of an alternative embodiment of the manufacturing module of FIG. 2 including a first vertical lift device, according to the present disclosure.

Turning now to FIG. 4, an alternative embodiment of a manufacturing module 32 is shown. Specifically, the transportation path 166 defined by the carrier tracks 162 may include a vertical discontinuity 200. It should be appreciated that, according to one example, the vertical discontinuity 200 may occur where the transportation path 166 includes a first transport height 202 that is vertically spaced from a second transport height 204. Specifically, the two sets of carrier tracks 162 of the first modular manufacturing station 118 may be positioned at the first transport height 202, while the carrier tracks 162 of the second modular manufacturing station 160 are positioned at the second transport height 204. Such a discontinuity along the transportation path 166 may occur as a result of the design of the manufacturing chain 10, as dictated by a topography of the manufacturing area 12 or a variety of other factors. Additionally, it may be desirable to alter the height of the transportation path 166 relative to the manufacturing equipment 120.

A first vertical lift device 206 may be provided for moving one of the sets of carrier tracks 162 in a vertical direction relative to the transportation path 166. Specifically, the first vertical lift device 206 may be configured to move one of the sets of carrier tracks 162, adjacent the vertical discontinuity 200, from the first transport height 202 to the second transport height 204. Vertical lift devices, such as vertical lift device 206, are known, and may include, for example, electric or pneumatic lifts, and, as such, may receive any necessary utilities from the utility transfer module 40. In addition, the first vertical lift device 206 may be supported by and/or secured to the skeleton 80 of the manufacturing module 32.

A control system, such as, for example, the station control system 124, may also be provided for controlling operation of the first vertical lift device 206. Specifically, and according to one embodiment, the station control system 124 may also be in communication with the first vertical lift device 206, and may be configured to issue operation signals thereto, such as, for example, a raise signal and a lower signal. For example, the first vertical lift device 206 may be configured to move the carrier tracks 162 from the first transport height 202 to the second transport height 204 in response to the raise signal. In addition, the first vertical lift device 206 may be configured to move the carrier tracks 162 from the second transport height 204 to the first transport height 202 in response to the lower signal.

Further, the station control system 124 may be configured to issue the raise signal and/or the lower signal in response to a carrier position that is detected by one of the position tracking devices 176, 178, and 180. Specifically, and according to one example, it may be desirable to issue the raise signal when it is determined that the carrier 164 has reached a predetermined position relative to the carrier tracks 162. After the carrier tracks 162 have been raised, the carrier 164 may continue to be transported along the transportation path 168 at the second transport height 204, such as by the drive system 174.

Figure 5:
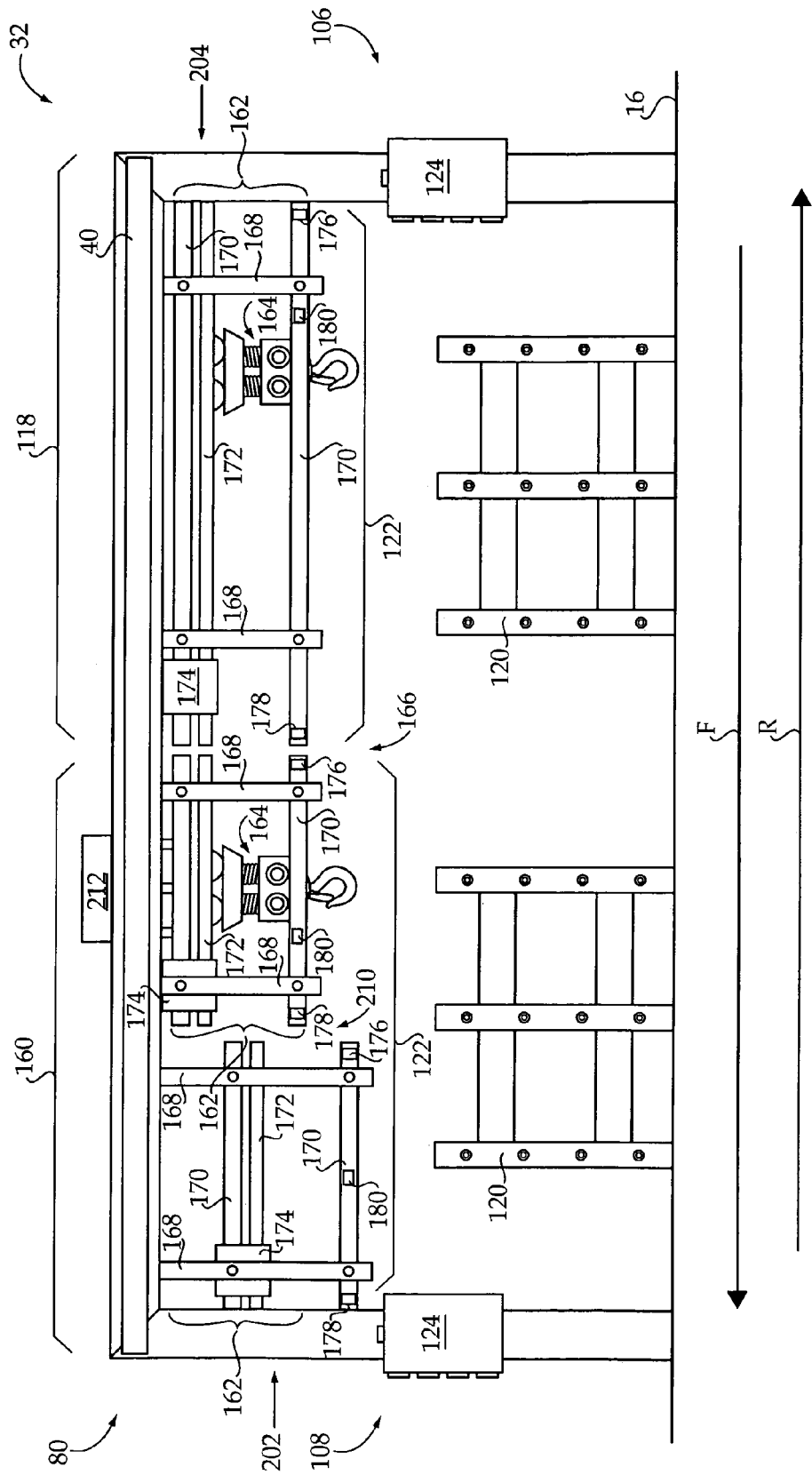
FIG. 5 is a side diagrammatic view of an alternative embodiment of the manufacturing module of FIG. 2 including a second vertical lift device, according to the present disclosure.

The transportation path 168 may include additional vertical discontinuities, such as, for example, a 'second vertical discontinuity 210, shown in FIG. 5. A second vertical lift device 212, similar to first vertical lift device 206, may, therefore, be provided to advance the carrier 164 through the second vertical discontinuity 210. Specifically, the second vertical lift device 212 may move the carrier tracks 162 from the second transport height 204 to the first transport height 202, such as in response to the lower signal issued from the station control system 124. It should be appreciated that the station control system 124 may issue the lower signal in response to a carrier position detected by one of the position tracking devices 176, 178, and 180. It should also be appreciated that any number of vertical lift devices, such as lift devices 206 and 212 that may be manually or automatically operated, may be used throughout the manufacturing chain 10 to accommodate vertical discontinuities and/or to move one of the carriers 164 in a vertical direction relative to the manufacturing equipment 120.

According to one embodiment, it may be desirable to incorporate one or more vertical lift devices, such as the lift devices 206 and 212, into the manufacturing chain 10 to accommodate manufacturing equipment 120 positioned above the planar floor 16. Specifically, the manufacturing chain 10 may include one or more pieces of manufacturing equipment 120 that traditionally were positioned below the planar floor 16, such as, for example, tanks or baths. For ease of deployment, the manufacturing chain 10 may position all equipment 120, including such tanks or baths, above ground and, therefore, may advance the carriers 164 through the manufacturing chain 10 and relative to the manufacturing equipment 120 using one or more vertical lift devices 206 and 212.

It should be appreciated that utilizing an article transportation device 122 having at least one of reverse, stop, and lift capabilities may allow a decrease in size and/or output capacity of the manufacturing equipment 120. For example, a conventional curing station may require a relatively large infrared heater capable of generating a large amount of heat. Specifically, the infrared heater may be sized to adequately cure a coating of paint on an article as it passes through the curing station at a speed equal to an overall line speed. However, the article transportation device 120, as described herein, may stop and/or reverse the article as it passes through the curing station 26. Therefore, the manufacturing equipment 120 or, more specifically, the infrared heaters used therein may have a lower heat output requirement. As a result, significant cost savings relative to the manufacturing equipment 120 may be recognized.

Figure 6:
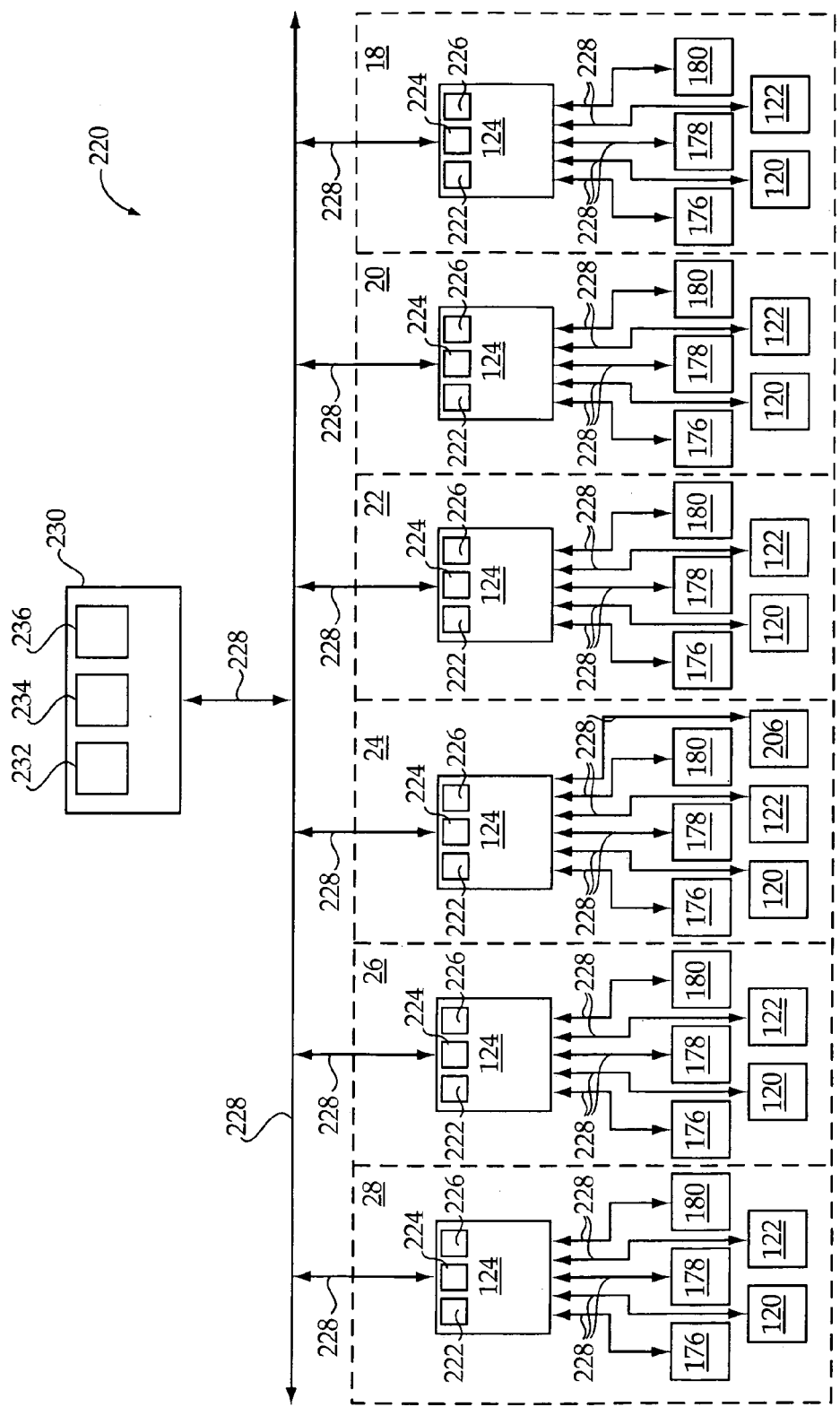
FIG. 6 is a block diagram of one embodiment of a control system for operating the manufacturing chain of FIG. 1, according to the present disclosure.

An exemplary control system 220 for the manufacturing chain 10 is shown generally in FIG. 6. Specifically, the control system 220 may include the station control systems 124 of each modular manufacturing station within the manufacturing chain 10, such as the modular manufacturing stations 18, 20, 22, 24, 26, and 28. It should be appreciated that the modular manufacturing stations 18, 20, 22, 24, 26, and 28 of FIG. 1 may include configurations similar to any of the embodiments of the first and second modular manufacturing stations 118 and 160 of FIGS. 2-5. Specifically, the manufacturing modules 32 of the manufacturing chain 10, as shown in FIG. 1, may each include one or more of the modular manufacturing stations 18, 20, 22, 24, 26, and 28, as dictated by the manufacturing process to be performed.

The station control systems 124 may include any commercially available microprocessors that include means for controlling the operation of at least one of the article transportation device 122 and the manufacturing equipment 120 of the respective manufacturing stations 18, 20, 22, 24, 26, and 28. Generally, each station control system 124 may include a processor 222, a memory 224, and any other components for running an application. Various circuits may also be associated with the station control systems 124, such as utility supply circuitry, signal conditioning circuitry, and any other types of circuitry needed for the operation of the respective manufacturing stations 18, 20, 22, 24, 26, and 28.

The station control systems 124 may each receive input from an operator interface 226, and may control and/or override the operation of the article transportation device 122 and/or manufacturing equipment 120 of the respective manufacturing stations 18, 20, 22, 24, 26, and 28 in response to the input. As should be appreciated, the operator interface 226 may receive an operator input command that is indicative of a desired operation. Accordingly, the operator interface 226 may include a touch screen, keyboard, control panel, or any other device or mechanism capable of facilitating communication between the operator and the station control systems 124. It is also contemplated that the input could alternatively be a computer-generated command from an automated system that assists the operator, or an autonomous system that operates in place of the operator.

According to one embodiment, the memory 224 of each station control system 124 may include a unique operation pattern corresponding to a specific task stored thereon. For example, the unique operation pattern may include one or more operation signals to be transmitted to at least one of the article transportation device 122 and the manufacturing equipment 120 via at least one communications conduit 228. Such operation signals may, for example, include the forward signal, the reverse signal, and the stop signal, as described above. In addition, the raise signal and the lower signal may be issued to an article transportation device 122 that includes a vertical lift device, such as vertical lift devices 206 and 212. Further, operation signals, such as, for example, a begin operation signal and a stop operation signal that may, intuitively, start or stop operation of the manufacturing equipment 120, may also be issued. It should be appreciated that a "unique operation pattern," as used herein, may generally refer to any sequence or pattern of movements or operations that facilitate the performance of a task, including such parameters as speed and direction of travel.

Each of the station control systems 124 may issue an operation signal, as describe above, in response to an operator input or, alternatively, automatically and according to a predetermined pattern, such as corresponding to the unique operation pattern stored thereon. According to one embodiment, the station control systems 124 may be in communication with the position tracking devices 176, 178, and 180 via the communications conduit 228, and may be configured to receive signals indicative of detected carrier positions. The station control systems 124 may also be configured to issue at least one of the operation signals corresponding to the unique operation pattern, based, at least in part, on one or more of the detected carrier positions.

A main control system 230 may be provided for coordinating operation of the station control systems 124 of each modular manufacturing station 18, 20, 22, 24, 26, and 28. Alternatively, however, one of the station control systems 124 may be designated a master control system for coordinating operation of the manufacturing chain 10. The main control system 230 may be of standard design and may generally include a processor 232, such as, for example, a central processing unit, a memory 234, and an input/output circuit, such as the communications conduit 228. It should be appreciated that the communications conduit 228, as referenced herein, may represent any form of wired and/or wireless communications, and may generally represent the transmission of any of the operation signals and/or positions signals described above. According to one embodiment, one or more data communications may be transmitted via the utility transfer modules 40.

The processor 232 may control operation of the main control system 230 by executing operating instructions, such as, for example, programming code stored in the memory 234, wherein operations may be initiated internally or externally to the main control system 230. As should be appreciated, a control scheme may be utilized that monitors outputs of the systems and/or components of each modular manufacturing station 18, 20, 22, 24, 26, and 28, such as, for example, sensors, actuators, or control units, via the communications conduit 228. Such information may, for example, be used to control inputs to the station control systems 124 and/or other systems and components of the each of the modular manufacturing stations 18, 20, 22, 24, 26, and 28.

According to one example, the memory 234 of the main control system 230 may store a plurality of unique operation patterns thereon. The main control system 230 may receive signals indicative of the first, second, and third detected carrier positions from each of the station control systems 124. In response, the main control system 230 may independently transmit operation signals, such as operation signals corresponding to one of the unique operation patterns, to each of the station control systems 124. The station control systems 124 may, in turn, transmit the operation signals to the article transportation device 122 and/or the manufacturing equipment 120 at the respective stations 18, 20, 22, 24, 26, and 28.

The main control system 230 may also index the carriers 164 of each modular manufacturing station 18, 20, 22, 24, 26, and 28 as each carrier 164 traverses to a contiguous station 18, 20, 22, 24, 26, and 28. According to one embodiment, the main control system 230 may simultaneously issue an index signal to the station control systems 124 of each modular manufacturing station 18, 20, 22, 24, 26, and 28. As such, the processors 222 of each station control system 124 may be configured to await and/or anticipate the index signal from the main control system 230 after the task to be performed at the respective station has been completed.

According to one example, indexing may include detecting a desired position of the carrier 164 within each station 18, 20, 22, 24, 26, and 28, such as by using one or more of the position tracking devices 176, 178, and 180. The main control system 230 may be configured to await signals from each modular manufacturing station 18, 20, 22, 24, 26, and 28 that are indicative of the desired position and then simultaneously transfer each carrier 164 to a contiguous station 18, 20, 22, 24, 26, and 28. Additional operation signals, therefore, may also be useful for indexing, such as, for example, the stop signal, a speed adjust signal, a transfer signal, or any other signal useful for detecting and transferring the carriers 164.

By coordinating operation of the entire manufacturing chain 10, the main control system 230 may receive a carrier position signal from one modular manufacturing station and issue an operation signal to another manufacturing stations based, at least in part, on that carrier position signal. For example, it may be desirable to transfer the carrier 164 of modular manufacturing station 18 only when the carrier 164 of the modular manufacturing station 20 has reached a predetermined position, such as a position detected by one or more of the position tracking devices 176, 178, and 180. It should be appreciated that the main control system 230 may utilize position signals from all of the position tracking devices 176, 178, and 180, at least in part, to coordinate operation of the entire manufacturing chain 10.

The main control system 230 may also include an operator interface, such as an interactive operator display 236, for continuously monitoring and/or controlling operation of each modular manufacturing station 18, 20, 22, 24, 26, and 28 of the manufacturing chain 10. According to one embodiment, the interactive operator display 236 may be used to continuously monitor a status of each article transportation device 122 of the manufacturing chain 10. Further, the interactive operator display 236 may be configured to display a real-time visual representation of each carrier 164 being transported through the manufacturing chain 10. The interactive operator display 236 may also be configured to receive an operator input command from an operator and transmit the operator input command to the article transportation device 122 or the manufacturing equipment 120 of at least one of the modular manufacturing stations 18, 20, 22, 24, 26, and 28.

Figure 7:
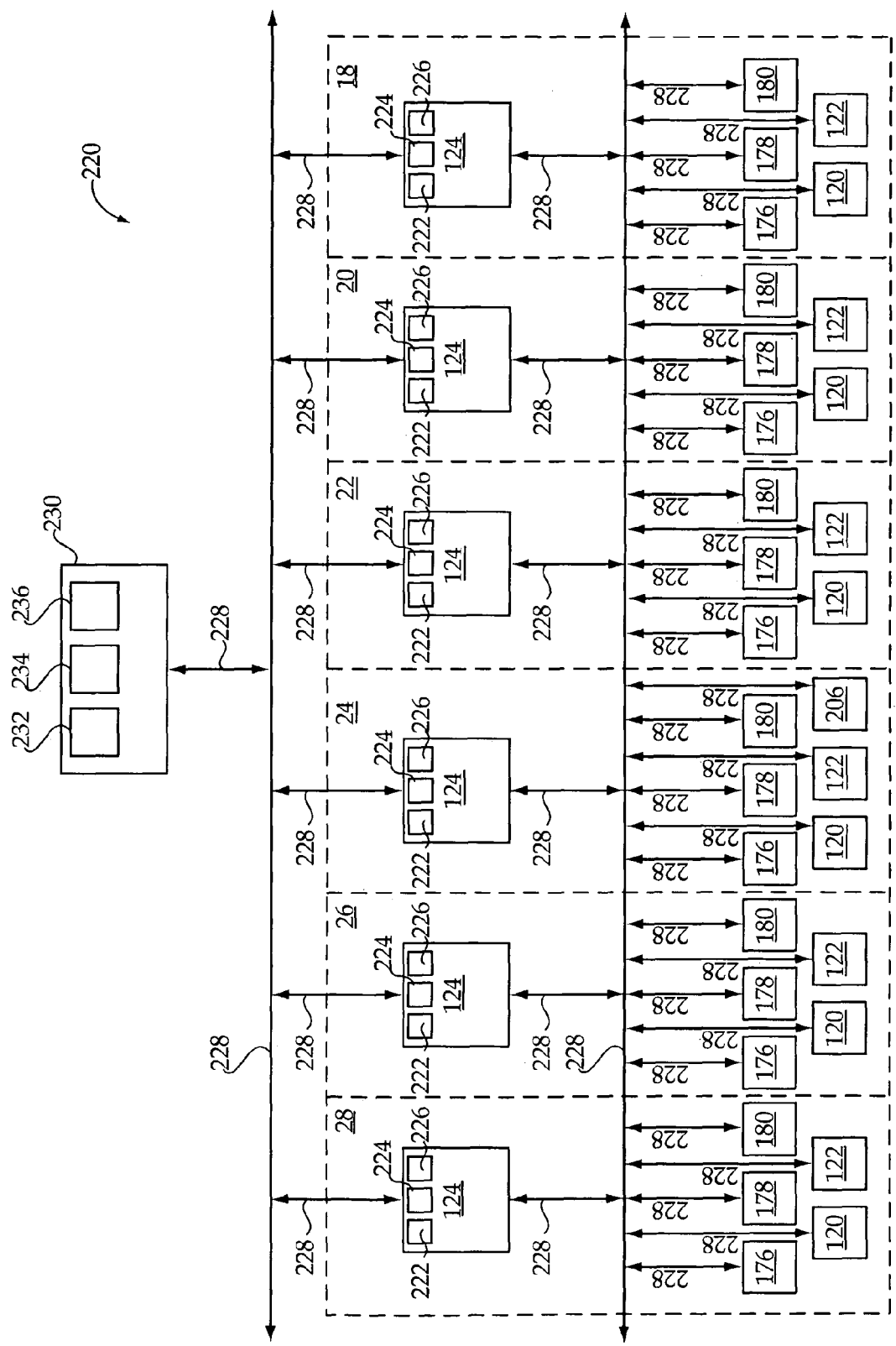
FIG. 7 is a block diagram of an alternative embodiment of a control system for operating the manufacturing chain of FIG. 1, according to the present disclosure.

It should be appreciated that numerous applications and configurations of the control system 220 are contemplated. According to one embodiment, the main control system 230, station control systems 124, position tracking devices 176, 178, and 180, article transportation devices 122 and manufacturing equipment 120 may all be interconnected through a local area network, as shown in FIG. 7. As such, the main control system 230 may directly communicate with the systems and/or components of each modular manufacturing station 18, 20, 22, 24, 26, and 28, and, therefore, may not direct communications, including operation signals, through the station control systems 124. Similarly, position signals may be communicated directly from the position tracking devices 176, 178, and 180 to the main control system 230.

INDUSTRIAL APPLICABILITY

The manufacturing chain 10 of the present disclosure may provide a portable and flexible manufacturing chain that supports an improved manufacturing process. Specifically, the manufacturing chain 10 includes, manufacturing modules 32 that may be relatively quickly and easily transported and deployed. In addition, modular manufacturing stations 18, 20, 22, 24, 26, and 28 may be readily added to and/or removed from the modules 32 of the manufacturing chain 10. Further, the article transportation system 30, and method of operation thereof, may allow independent process control at each modular manufacturing station 18, 20, 22, 24, 26, and 28 and, therefore, may provide improved efficiency with respect to the manufacturing process. Although a paint process is described, it should be appreciated that the manufacturing chain 10, as described herein, may be used to perform any of a variety of manufacturing processes.

Referring generally to FIGS. 1-7, the manufacturing chain 10, such as, for example, a paint line, may be deployed by erecting a plurality of manufacturing modules 32, as needed. Specifically, a plurality of support beams 82, 84, 86, 88, 98, 100, 102, and 104 may be secured to the planar floor 16 of a manufacturing area 12 and may be interconnected to provide a framework or skeleton 80. One or more of the support beams support beams 82, 84, 86, 88, 98, 100, 102, and 104 may be capable of expansion and/or contraction to further ease the transport and/or deployment of each manufacturing module 32. The skeleton 80 may provide structural support for one or more modular manufacturing stations, such as, for example, the first modular manufacturing station 118 and the second modular manufacturing station 160 and/or the modular manufacturing stations 18, 20, 22, 24, 26, and 28. Further, the skeleton may include pre-constructed utilities, namely a utility transfer module 40, supported by one or more of the support beams 82, 84, 86, 88, 98, 100, 102, and 104.

Each modular manufacturing station, such as stations 118 and 160, may include at least one piece of manufacturing equipment 120, an article transportation device 122 representing a portion of the article transportation system 30 corresponding to the respective station, and a station control system 124. It should be appreciated that the manufacturing equipment 120 may be positioned above the planar floor 16 and may be portable to facilitate movement of the equipment 120 from one location, such as a storage location, and into an operable position relative to the station. The manufacturing equipment 120, as well as the article transportation device 122, the station control system 124, and various other systems and/or components of each station 118 and 160 may receive one or more utilities from the utility transfer module 40.

It should be appreciated that modifying the manufacturing chain 10, such as adding or removing a modular manufacturing station may also be accomplished with relative ease. Specifically, a modular manufacturing station, similar to manufacturing stations 116 and 180, may be added to the manufacturing chain 10 by interconnecting a plurality of beams 82, 84, 86, 88, 98, 100, 102, and 104 to form a skeleton 80. The skeleton 80 may be connected to or, alternatively, positioned adjacent a contiguous manufacturing module 32. A utility transfer module 40, which may be supported by one of the beams 82, 84, 86, 88, 98, 100, 102, and 104, may be connected to a utility transfer module 40 of the contiguous manufacturing module 32 to provide utilities to the added manufacturing station.

One or more of an article transportation device 122, a piece of manufacturing equipment 120, and a station control system 124 may be supported by the skeleton 80, or otherwise positioned within an operable distance of the added manufacturing station. In addition, one or more of the article transportation device 122, the manufacturing equipment 120, and the station control system 124 may be connected to the utility transfer module 40 to receive one or more utilities therefrom, such as using quick connect coupling members, as described above.

Operation of the manufacturing chain 10 may be controlled and/or coordinated using the control system 220. Specifically, one or more of the main control system 230 and the station control systems 124 may be configured to advance at least one carrier 164 from a beginning of the manufacturing chain 10 to an end of the manufacturing chain 10, such as in the forward transport direction "F." This advancement, according to a specific example, may include independently moving a carrier 164 of the first modular manufacturing station 118 according to a first unique operation pattern and a carrier 164 of the second modular manufacturing station 160 according to a second unique operation pattern. According to one embodiment, the first unique operation pattern may include the forward transport direction "F" and the reverse transport direction "R." The second unique operation pattern may, for example, include moving the carrier 164 in the vertical direction relative to the transportation path 166, such as by raising and/or lowering the carrier 164.

The memory 234 of the main control system 230 may store the first and second unique operation patterns for controlling operation of the first and second modular manufacturing stations 118 and 160, respectively, thereon. The first position tracking devices 176 of each modular manufacturing station 118 and 160 may detect a first position of each carrier 164 as it is transported through the respective one of the manufacturing stations 118 and 160, and transmit first position signals to the main control system 230. It should be appreciated that any of the operation signals, including position signals, may be transmitted through the station control systems 124.

The processor 232 of the main control system 230 may be configured to independently transmit an operation signal corresponding to each of the first and second unique operation patterns to the respective one of the manufacturing stations 118 and 160 based, at least in part, on the detected first positions. For example, the processor 232 may independently transmit one or more operation signals, such as, for example, the forward signal, to each article transportation device 122 upon detecting that each carrier 164 is entering the respective one of the modular manufacturing stations 118 and 160. Similarly, the processor 232 may be configured to independently transmit one or more operation signals to the manufacturing equipment 120 based, at least in part, on the detected first positions.

In addition, the second position tracking devices 178 and the third position tracking devices 180 of the manufacturing stations 118 and 160 may detect second and third positions, respectively, and transmit second and third position signals to the main control system 230, such as through the station control systems 124. The processor 232 may also be configured to independently transmit an operation signal corresponding to each of the first and second unique operation patterns to the respective one of the manufacturing stations 118 and 160 based, at least in part, on one of the detected second and third positions. Similarly, the processor 232 may be configured to independently transmit one or more operation signals to the manufacturing equipment 120 based, at least in part, on one of the detected second and third positions.

For example, the processor 232 may be configured to transmit the reverse signal to the article transportation device 122 of the first modular manufacturing station 118 upon detecting that the carrier 164 has reached a predetermined position relative to the manufacturing equipment 120. Similarly, the processor 232 may be configured to transmit the lower signal to the article transportation device 122, or second vertical lift device 212, of the second modular manufacturing station 160 upon detecting that the carrier 164 has reached a predetermined position relative to the manufacturing equipment 120. Determining that the carrier 164 has reached the predetermined position, in either example, may be based, at least in part, on one of the second and third position signals.

In addition, the processor 232 of the main control system 230 may be configured to index the carriers 164 of each modular manufacturing station 118 and 160 as each carrier 164 traverses to a contiguous manufacturing station. Indexing may, for example, include detecting one of the second and third positions, as described above, of each carrier 164 and simultaneously transferring each carrier 164 to a contiguous manufacturing station.

It should be appreciated that manufacturing chain 10, including a plurality of modular manufacturing stations 18, 20, 22, 24, 26, and 28, as described herein, may be deployed and/or modified with relative ease. Each modular manufacturing station 18, 20, 22, 24, 26, and 28, as further exemplified by first and second modular manufacturing stations 118 and 160, is characterized as having a separate article transportation device 122 that allows each carrier 164 to move independently through the respective station. The control system 220 coordinates the independent movements occurring at each station 18, 20, 22, 24, 26, and 28 and synchronizes the transfer of each carrier 164 to a contiguous one of the modular manufacturing stations to define one overlying process flow for the manufacturing chain 10.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A manufacturing chain, comprising:
   a plurality of modular manufacturing stations positioned in series;
   one of a first position tracking device and a second position tracking device at different locations in a first modular manufacturing station configured to detect one of a first position and a second position, respectively, of a carrier being transported along a first article transportation device through the first modular manufacturing station; and
   a control system in communication with the first position tracking device and the second position tracking device, wherein the control system is configured to receive a signal indicative of the detected first position or second position and issue an operation signal to a second article transportation device of a second modular manufacturing station based, at least in part, on the detected first position or second position.

2. The manufacturing chain of claim 1, wherein the control system is further configured to issue an operation signal to at least one of the first article transportation device and a piece of manufacturing equipment of the first modular manufacturing station based, at least in part, on the detected first position or second position.

3. The manufacturing chain of claim 2, wherein each modular manufacturing station includes a first position tracking device and a second position tracking device for detecting one of a first position or a second position of a carrier being transported through the modular manufacturing station.

4. The manufacturing chain of claim 3, wherein the control system includes a main control system in communication with the first position tracking device and the second position tracking device of each modular manufacturing station, wherein the main control system is further configured to receive a signal indicative of the detected first position or second position from the first position tracking device or the second position tracking device, respectively, of each modular manufacturing station.

5. The manufacturing chain of claim 4, wherein the main control system is further configured to issue an operation signal to at least one of an article transportation device and a piece of manufacturing equipment of each modular manufacturing station based, at least in part, on the detected first position or second position from the first position tracking device or the second position tracking device, respectively, of each modular manufacturing station.

6. The manufacturing chain of claim 5, wherein the control system further includes a plurality of station control systems, wherein each station control system is in communication with the article transportation device and the manufacturing equipment of a different one of the modular manufacturing stations; and
   each of the station control systems is in communication with the main control system.

7. The manufacturing chain of claim 6, wherein the main control system is further configured to independently issue an operation signal to each station control system; and each of the article transportation devices is operable to move a carrier forward or reverse or stop movement of the carrier responsive to an operation signal.

8. A manufacturing chain, comprising:
a plurality of modular manufacturing stations positioned in series;
a first position tracking device of a first modular manufacturing station configured to detect a first position of a carrier being transported along a first article transportation device through the first modular manufacturing station;
a control system in communication with the first position tracking device, wherein the control system is configured to receive a signal indicative of the detected first position and issue an operation signal to a second article transportation device of a second modular manufacturing station based, at least in part, on the detected first position;
wherein the control system is further configured to issue an operation signal to at least one of the first article transportation device and a piece of manufacturing equipment of the first modular manufacturing station based, at least in part, on the detected first position;
wherein each modular manufacturing station includes a first position tracking device for detecting a first position of a carrier being transported through the modular manufacturing station;
wherein the control system includes a main control system in communication with the first position tracking device of each modular manufacturing station, wherein the main control system is further configured to receive a signal indicative of the detected first position from the first position tracking device of each modular manufacturing station;
wherein the main control system is further configured to issue an operation signal to at least one of an article transportation device and a piece of manufacturing equipment of each modular manufacturing station based, at least in part, on the detected first position from the first position tracking device of each modular manufacturing station;
wherein the control system further includes a plurality of station control systems, wherein each station control system is in communication with the article transportation device and the manufacturing equipment of a different one of the modular manufacturing stations; and
wherein each modular manufacturing station further includes a second position tracking device configured to detect a second position of the carrier being transported through the modular manufacturing station, wherein the main control system is in communication with the second position tracking device of each modular manufacturing station.

9. The manufacturing chain of claim 8, wherein the main control system is further configured to issue an operation signal to at least one of the article transportation device and the piece of manufacturing equipment of each modular manufacturing station based, at least in part, on the detected first position and the detected second position from the first and second position tracking devices of each modular manufacturing station.

10. A manufacturing module, comprising:
a plurality of beams forming a skeleton and defining an entry and an exit of the manufacturing module;
at least a first modular manufacturing station and a second modular manufacturing station disposed between the entry and the exit, wherein each of the first modular manufacturing station and the second modular manufacturing station includes an article transportation device supported by at least one of the beams, at least one piece of manufacturing equipment, first position tracking device configured to detect a carrier being transported along the article transportation device through the entry, and a second position tracking device configured to detect a carrier being transported along the article transportation device through the exit; and
a control system in communication with the first position tracking device of the first modular manufacturing station, wherein the control system is configured to receive a signal indicative of the detected first position and issue an operation signal to a second article transportation device of the second modular manufacturing station based, at least in part, on the detected first position.

11. The manufacturing module of claim 10, wherein the control system is further configured to issue an operation signal to at least one of a first article transportation device and a first piece of manufacturing equipment of the first modular manufacturing station based, at least in part, on a position signal from a third position tracking device.

12. The manufacturing module of claim 11, wherein each of a plurality of modular manufacturing stations disposed between the entry and exit includes at least two spaced apart a first position tracking devices for detecting a first position of a carrier being transported through the modular manufacturing station.

13. The manufacturing module of claim 12, wherein the control system includes a main control system in communication with the at least two spaced apart position tracking devices of each modular manufacturing station, wherein the main control system is further configured to receive a signal indicative of the detected position from one of the at least two spaced apart position tracking devices of each modular manufacturing station.

14. The manufacturing module of claim 13, wherein the main control system is further configured to issue an operation signal to at least one of an article transportation device and a piece of manufacturing equipment of each modular manufacturing station based, at least in part, on the detected position from one of the at least two position tracking devices of each modular manufacturing station.

15. A manufacturing module, comprising:
a plurality of beams forming a skeleton and defining an entry and an exit of the manufacturing module;
at least a first modular manufacturing station and a second modular manufacturing station disposed between the entry and the exit, wherein each of the first modular manufacturing station and the second modular manufacturing station includes an article transportation device supported by at least one of the beams, at least one piece of manufacturing equipment, and a first position tracking device configured to detect a first position of a carrier being transported along the article transportation device through the modular manufacturing station;
a control system in communication with the first position tracking device of the first modular manufacturing station, wherein the control system is configured to receive a signal indicative of the detected first position and issue an operation signal to a second article transportation device of the second modular manufacturing station based, at least in part, on the detected first position;
wherein the control system is further configured to issue an operation signal to at least one of a first article transportation device and a first piece of manufacturing equipment of the first modular manufacturing station based, at least in part, on the detected first position;

wherein each of a plurality of modular manufacturing stations disposed between the entry and exit includes a first position tracking device for detecting a first position of a carrier being transported through the modular manufacturing station;

wherein the control system includes a main control system in communication with the first position tracking device of each modular manufacturing station, wherein the main control system is further configured to receive a signal indicative of the detected first position from the first position tracking device of each modular manufacturing station; and wherein each modular manufacturing station further includes a second position tracking device configured to detect a second position of the carrier being transported through the modular manufacturing station, and wherein the main control system is in communication with the second position tracking device of each modular manufacturing station.

16. A method for operating a manufacturing chain having a plurality of modular manufacturing stations, comprising:

advancing at least one carrier from a beginning of the manufacturing chain to an end of the manufacturing chain;

wherein the advancing step includes detecting a first position of a first carrier within a first modular manufacturing station using one of a first position tracking device and a second position tracking device, and issuing an operation signal to an article transportation device of a second modular manufacturing station based, at least in part, on the detected first position; and wherein the first position tracing device and the second position tracking device are at different locations along the manufacturing chain within the first modular manufacturing station.

17. The method of claim 16, wherein the advancing step further includes issuing an operation signal to at least one of an article transportation device of the first modular manufacturing station and a piece of manufacturing equipment of the first modular manufacturing station based, at least in part, on the detected first position; and simultaneously moving a first carrier in a forward direction, moving a second carrier in a reverse direction and stopping a third carrier at different locations in the manufacturing chain.

18. The method of claim 17, wherein the advancing step further includes transmitting a carrier position signal from at least one of a plurality of position tracking devices, receiving the carrier position signal at a main control system, and transmitting an operation signal from the main control system; and wherein the first carrier is moving in the first modular manufacturing station, the second carrier is moving in the second modular manufacturing station and the third carrier is stopped in a third modular manufacturing station.

19. The method of claim 18, wherein the advancing step further includes receiving the operation signal at a station control system of at least one of the modular manufacturing stations; and transmitting an index signal to the station control system of each of a plurality of modular manufacturing stations.

20. The method of claim 18, wherein the advancing step further includes receiving the operation signal at one of an article transportation device and a piece of manufacturing equipment of at least one of modular manufacturing stations; and transferring a plurality of carriers to a contiguous modular manufacturing station responsive to the index signal.

* * * * *